United States Patent
Tayal et al.

(10) Patent No.: US 10,499,294 B1
(45) Date of Patent: Dec. 3, 2019

(54) SYSTEM, METHOD, AND COMPUTER PROGRAM FOR MITIGATION OF USER-SPECIFIC PING-PONG HANDOVER

(71) Applicant: Amdocs Development Limited, Limassol (CY)

(72) Inventors: Sagar Tayal, Ambala (IN); Ram Kumar Sharma, Rajasthan (IN); Krishnan Venkataraghavan, Chennai (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/955,535

(22) Filed: Apr. 17, 2018

(51) Int. Cl.
*H04W 36/00* (2009.01)
*H04W 36/24* (2009.01)
*H04W 36/32* (2009.01)
*H04W 76/27* (2018.01)

(52) U.S. Cl.
CPC ... *H04W 36/0088* (2013.01); *H04W 36/0094* (2013.01); *H04W 36/245* (2013.01); *H04W 36/32* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 9,538,427 B2 | 1/2017 | Lu et al. | |
| 2009/0323638 A1 | 12/2009 | Catovic et al. | |
| 2012/0307791 A1* | 12/2012 | Veres | H04W 36/32 370/331 |
| 2014/0274049 A1* | 9/2014 | Singh | H04W 36/0083 455/436 |
| 2016/0198373 A1* | 7/2016 | Thangarasa | H04W 36/0088 455/436 |
| 2016/0219475 A1* | 7/2016 | Kim | H04L 5/00 |
| 2018/0049078 A1* | 2/2018 | Yang | H04W 24/10 |

FOREIGN PATENT DOCUMENTS

CN 101453770 A 6/2009

* cited by examiner

*Primary Examiner* — Chirag G Shah
*Assistant Examiner* — Srinivasa R Reddivalam
(74) *Attorney, Agent, or Firm* — Zilka-Kotab, P.C.

(57) ABSTRACT

A system, method, and computer program product are provided for mitigation of user-specific ping-pong handover. In operation, user equipment (UE) monitors for a ping-pong handover scenario between the UE and a plurality of nodes in a wireless communication network. The UE determines whether a state of the UE is static, if it is determined that the UE is experiencing a ping-pong handover scenario. The UE receives a deferred measurement time indicator from a best serving node of the plurality of nodes, if it is determined that the state of the UE is static. The UE defers sending a measurement report to the plurality of nodes for a time-period associated with the deferred measurement time indicator.

12 Claims, 13 Drawing Sheets

US 10,499,294 B1

SYSTEM, METHOD, AND COMPUTER PROGRAM FOR MITIGATION OF USER-SPECIFIC PING-PONG HANDOVER

FIELD OF THE INVENTION

The present invention relates to ping-pong handover mitigation in a wireless communication network, and more particularly to user-specific ping-pong handover mitigation.

BACKGROUND

Radio access networks often utilize technology such as Long Term Evolution (LTE). LTE includes a communication node, known as eNodeB (eNB) or a best serving node that provides a connection between User Equipment (UE) and the network.

Generally, in wireless network communication systems such as LTE, eNodeBs (eNBs) are utilized to provide network services to multiple UEs in their respective signal areas. One of the main challenges in providing seamless connectivity to the UEs is to perform efficient handover processes for the UEs that are mobile, or ping-pong handovers for static users. A typical handover process involves handover of a UE from an eNodeB of a serving cell to another eNodeB of a neighboring cell that may have better signal strength. Generally, the handover is performed due to movement of a UE from one location to another. There may be variations in a network that may cause the handover to undergo a failure. The failure may be a premature handover, a delayed handover, or a fluctuating handover. The fluctuating handover results in a ping-pong handover that causes unnecessary signal traffic. In many cases, even if a user is static, or moves very little within a fixed area such as in a shopping mall, there may be occurrences of ping-pong handover for various reasons.

Such ping-pong handovers affect user-experience and network performance such as a high rate of drop-calls, a high muting rate, high battery consumption of UEs, or the like.

There is thus a need for addressing these and/or other issues associated with the prior art.

SUMMARY

A system, method, and computer program product are provided for mitigation of user-specific ping-pong handover. In operation, user equipment (UE) monitors for a ping-pong handover scenario between the UE and a plurality of nodes in a wireless communication network. The UE determines whether a state of the UE is static, if it is determined that the UE is experiencing a ping-pong handover scenario. The UE receives a deferred measurement time indicator from a best serving node of the plurality of nodes, if it is determined that the state of the UE is static. The UE defers sending a measurement report to the plurality of nodes for a time-period associated with the deferred measurement time indicator.

DETAILED DESCRIPTION

Figure 1:
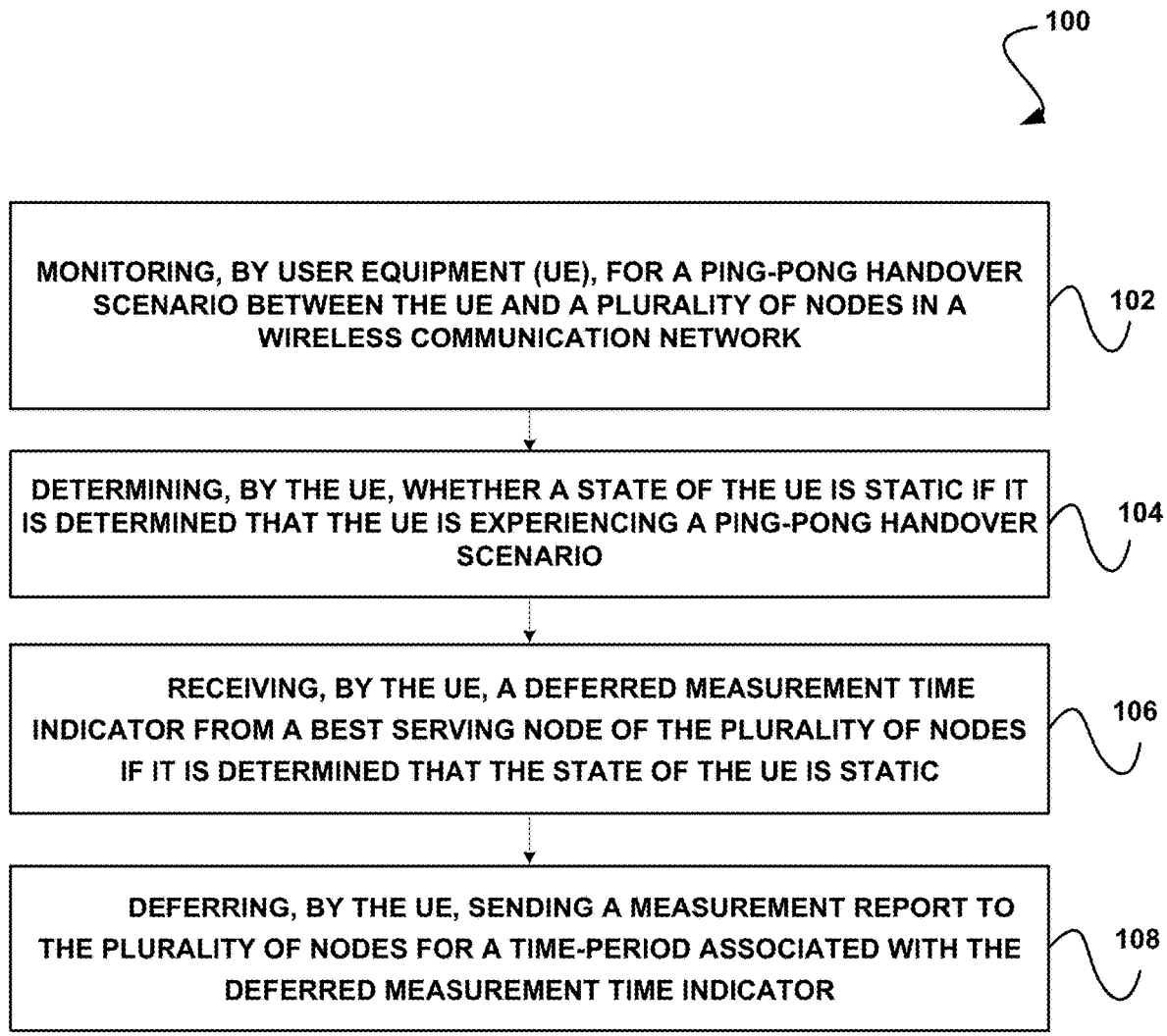
FIG. 1 illustrates a method for mitigation of user-specific ping-pong handover, in accordance with one embodiment.

FIG. 1 illustrates a method 100 for mitigation of user-specific ping-pong handover, in accordance with one embodiment.

In operation, user equipment (UE) monitors for a ping-pong handover scenario between the UE and a plurality of nodes in a wireless communication network. See operation 102. In this case, monitoring for the ping-pong handover scenario may include the UE determining whether a pre-defined number of ping-pong handovers have occurred in a predefined amount of time.

The wireless communication network may include any radio access network with technology such as Long Term Evolution (LTE). The LTE includes a communication node, known as eNodeB (eNB) or a best serving node that provides a connection between the UE and the network. The UE may be a hand-held telephone such as a mobile phone, or smart phone, a laptop computer equipped with a mobile broadband adapter, or any other communication device associated with a user.

The UE determines whether a state of the UE is static, if it is determined that the UE is experiencing a ping-pong handover scenario. See operation 104.

The UE receives a deferred measurement time indicator from a best serving node of the plurality of nodes, if it is determined that the state of the UE is static. See operation 106. In one embodiment, the deferred measurement time indicator may be received by the UE in a RRC Connection reconfiguration message. In this case, the RRC Connection reconfiguration message may include a parameter including the deferred measurement time indicator.

The UE defers sending a measurement report to the plurality of nodes for a time-period associated with the deferred measurement time indicator. See operation 108. Further, the UE may monitor for an abnormal event occurrence while deferring sending the measurement report. In this case, the UE may send periodic report information (e.g. Channel State Information-Channel Quality Indication, Precoding Matrix Indicators, Rank Indication, and power headroom reports, etc.) to the best serving node. It will be based on the deferred measurement time indicator otherwise. On the other hand, the UE may disregard the deferred measurement time indicator and send the measurement report to one or more of the plurality of nodes if it is determined that an abnormal event has occurred.

Thus, the system implements a method for user-specific ping-pong handover (HO) mitigation in a wireless communication network by selectively triggering measurement reconfigurations for those UEs that are static. If the UE is static, the UE determines a ping-pong handover count occurred in a certain amount of time (e.g. X number of ping-pong handovers occurred in Y amount of time, etc.). Then the UE uses intelligence to prevent ping-pong handover attempts for a predefined time-period.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Generally, in wireless network communication systems such as LTE, eNodeBs (eNBs) are utilized to provide network services to multiple UEs in their respective signal areas. One of the main challenges in providing seamless connectivity to the UEs is to perform efficient handover processes for the UEs that are mobile, or ping-pong handovers for static users. A typical handover process involves handover of a UE from an eNodeB of a serving cell to another eNodeB of a neighboring cell that may have better signal strength. Generally, the handover is performed due to movement of a UE from one location to another. There may be variations in a network that may cause the handover to undergo a failure. The failure may be a premature handover, a delayed handover, or a fluctuating handover. The fluctuating handover results in a ping-pong handover that causes unnecessary signal traffic. In many cases, even if a user is static, or moves very little within a fixed area such as in a shopping mall, there may be occurrences of ping-pong handover for various reasons.

Such ping-pong handovers affect user-experience and network performance such as a high rate of drop-calls, a high muting rate, high battery consumption of UEs, or the like. Two example scenarios of a UE that may undergo the ping-pong handover are represented with reference to FIGS. 2 and 3.

Figure 2:
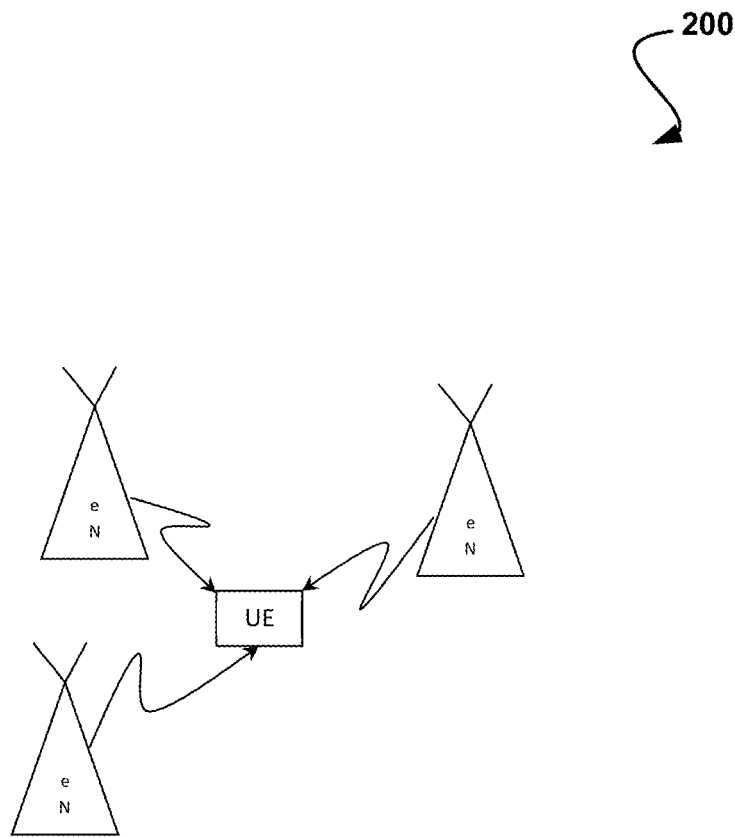
FIG. 2 shows a system flow diagram illustrating an example scenario of a UE that may undergo a ping-pong handover including a static UE in a multiple eNB environment, in accordance with one embodiment.

FIG. 2 shows a system flow diagram 200 illustrating an example scenario of a UE that may undergo the ping-pong handover including a static UE in a multiple eNB environment, in accordance with one embodiment. As an option, the system flow diagram 200 may be implemented in the context of the details of the previous figure and/or any subsequent figure(s). Of course, however, the system flow diagram 200 may be implemented in the context of any desired environment. Further, the aforementioned definitions may equally apply to the description below.

In a network system, such as a multiple-server environment with comparable signal conditions, static users may constitute a majority of network traffic. The static users may include users that are within a range of cell coverage or users in a particular location. As shown in FIG. 2, the environment includes a static UE and three eNodeBs. In one scenario, network strength of one of the eNB s may become fluctuating. For example, if the UE is in a mall or a basement parking area, then strength of a serving eNB may be fluctuating, and there may be instantaneous better signals from other neighboring eNBs. This may result in ping-pong handover of the UE from the serving eNB to another neighboring eNB with slightly better signal strength. However, the handover between neighboring eNodeBs may undergo a failure.

The failure may affect network performance and user experience. For example, there may be a continuous handover between two eNodeBs due to network signal fluctuations or non-dominance. For instance, during the handover, the signal may bounce back and forth between the eNodeBs that result into a ping-pong handover.

Figure 3:
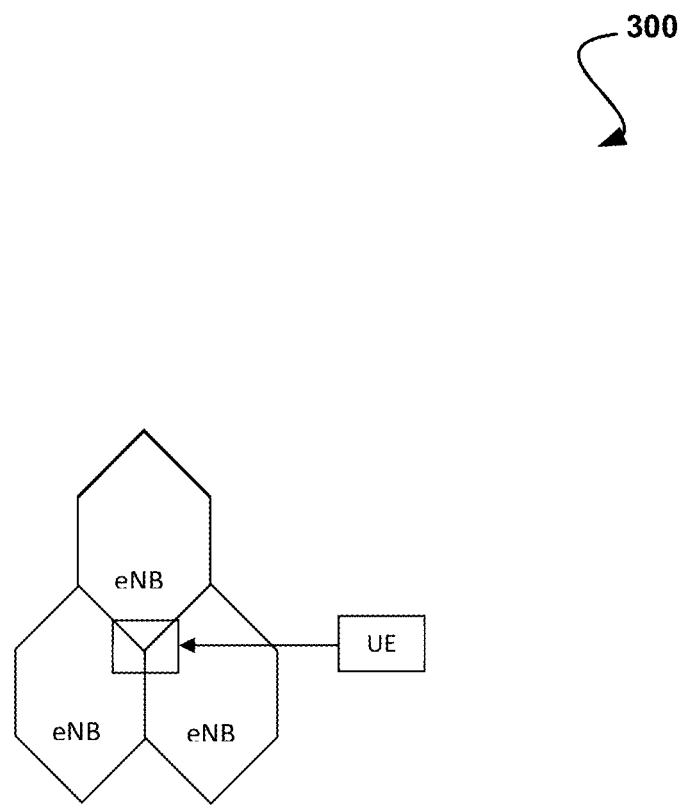
FIG. 3 shows a system flow diagram illustrating an example scenario of a UE that may undergo a ping-pong handover including a UE location at an intersection of multiple eNBs, in accordance with one embodiment.

FIG. 3 shows a system flow diagram 300 illustrating an example scenario of a UE that may undergo the ping-pong handover including a UE location at an intersection of multiple eNBs, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

In some cases of a real time scenario, for a static user, distance between a serving cell and a target cell may be so short that the network coverage or signal strength received by a UE may be almost equal. For example, as represented in FIG. 3, a UE may be in a location where the UE may experience almost equal coverage from multiple eNodeBs, eNB1, eNB2 and eNB3.

With respect to the ping-pong handover process, in a wireless network, radio quality of neighboring cells is measured by a UE for performing the handover process. The radio quality is measured using the parameters, Reference Signal Received Power (RSRP) and Reference Signal Received Quality (RSRQ). The UE reports the radio quality through a measurement report (MR) when the neighboring cell has better quality than its serving cell. The measurement report is sent when events, particularly event A3 and event A5, are triggered.

Event A3 is triggered when the following criteria is met: RSRP TargetCell>RSRPServing Cell+A3offset. Event A5 is triggered when the following criteria is met: RSRP SourceCell<Threshold1 && RSRP TargetCell>Threshold2.

Figure 4:
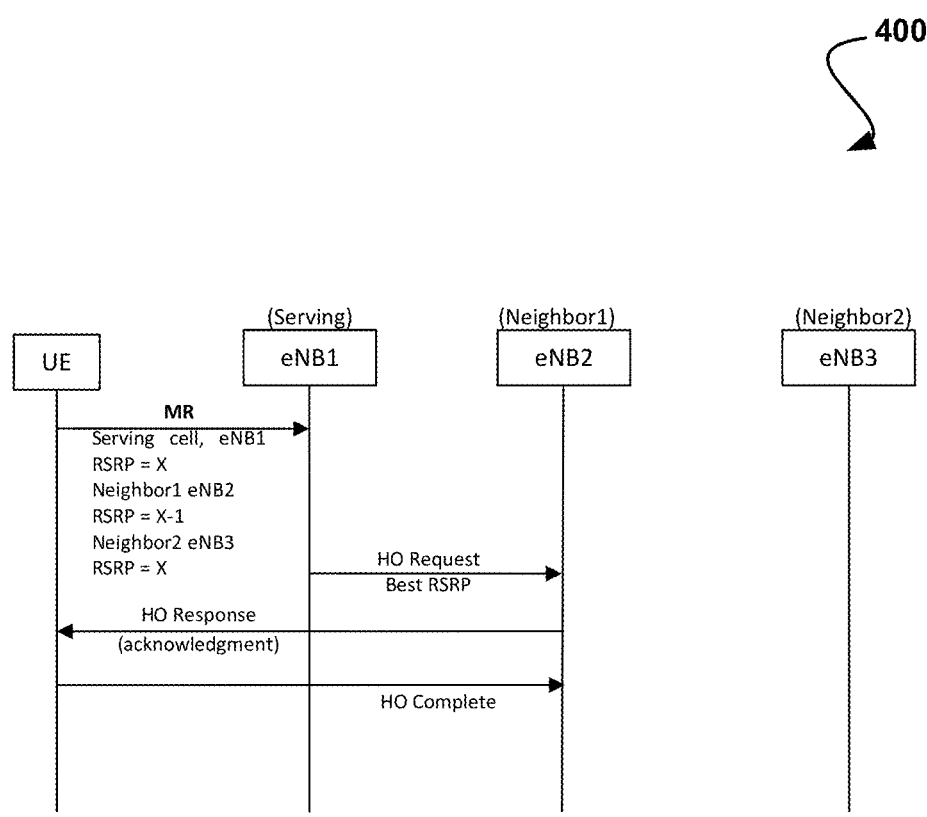
FIG. 4 shows a system flow diagram illustrating the handover process for a UE served by three eNodeBs having comparable signal strengths, in accordance with one embodiment.

FIG. 4 shows a system flow diagram 400 illustrating the handover process for a UE served by three eNodeBs having comparable signal strengths, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

FIG. 4 shows a handover process flow from eNB1 to eNB2 for a UE served by three eNBs. The UE sends the MR to serving cell eNB1 for initiating the handover process. In the MR, parameters included are measurement IDs, RSRP, and RSRQ of a source cell and neighbor cells 1, 2 (i.e. eNB1 and eNB2) respectively. After receiving the MR, eNB1 sends the HO request to a neighboring cell that has the best radio quality.

As shown in FIG. 4, it is assumed that eNB2 is the best neighbor cell available. The MR is sent by the UE when event A3 or event A5 criterion is met on serving eNB (i.e. eNB1). eNB1 then sends the HO request to eNB2. The HO request is sent to eNB2 when RSRP of Neighbor 1 (eNB2) >Serving cell (eNB1), RSRP of Neighbor 2 (eNB3). At this instant, necessary resource allocation is carried out. After the resource allocation, eNB2 sends an acknowledgement response to the UE that the handover process is completed. The UE also sends an acknowledgment to eNB2 about the handover process completion.

After completion of handover to eNB2, which now behaves as the new serving cell, the UE keeps monitoring the radio conditions of Neighbor cells eNB1 and eNB3. It may be noted that in a multi radio environment, fluctuations in radio signals may occur from time to time. In one such case, eNB3 may become better than the current serving cell eNB2. If eNB3 becomes better than eNB2, the handover will happen to eNB3 as shown in FIG. 5.

Figure 5:
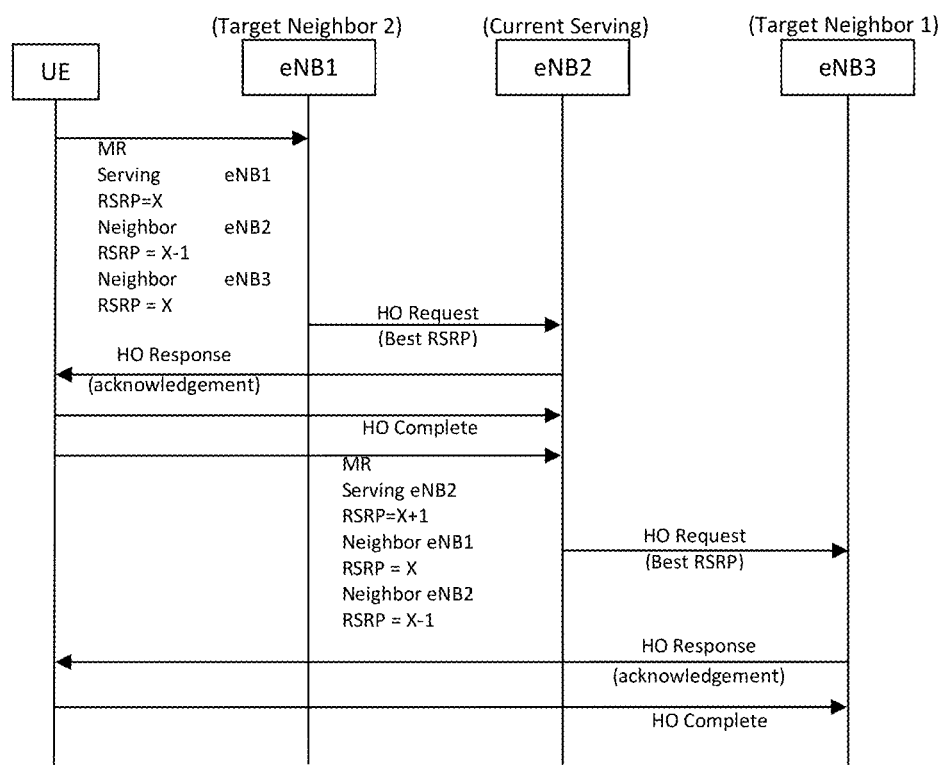
FIG. 5 shows a system flow diagram illustrating the handover process for a UE served by three eNodeBs having comparable signal strengths, in accordance with one embodiment.

FIG. 5 shows a system flow diagram 500 illustrating the handover process for a UE served by three eNodeBs having comparable signal strengths, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

In FIG. 5, the MR is sent by the UE when event A3 or event A5 criterion is met on serving eNB2. eNB2 sends the HO request to eNB3 when RSRP of Neighbor 1 (eNB3) >Serving Cell (eNB2), RSRP of Neighbor 2 (eNB1). After the resource allocation, eNB3 sends an acknowledgement response to the UE that the handover process is completed. The UE also sends an acknowledgment to eNB3 about the handover process completion.

In yet another scenario, eNB1 can again become better for the UE and the handover can take place back to eNB1 from eNB3. The handover process from eNB3 back to eNB1 is described in the following with reference to FIG. 6.

Figure 6:
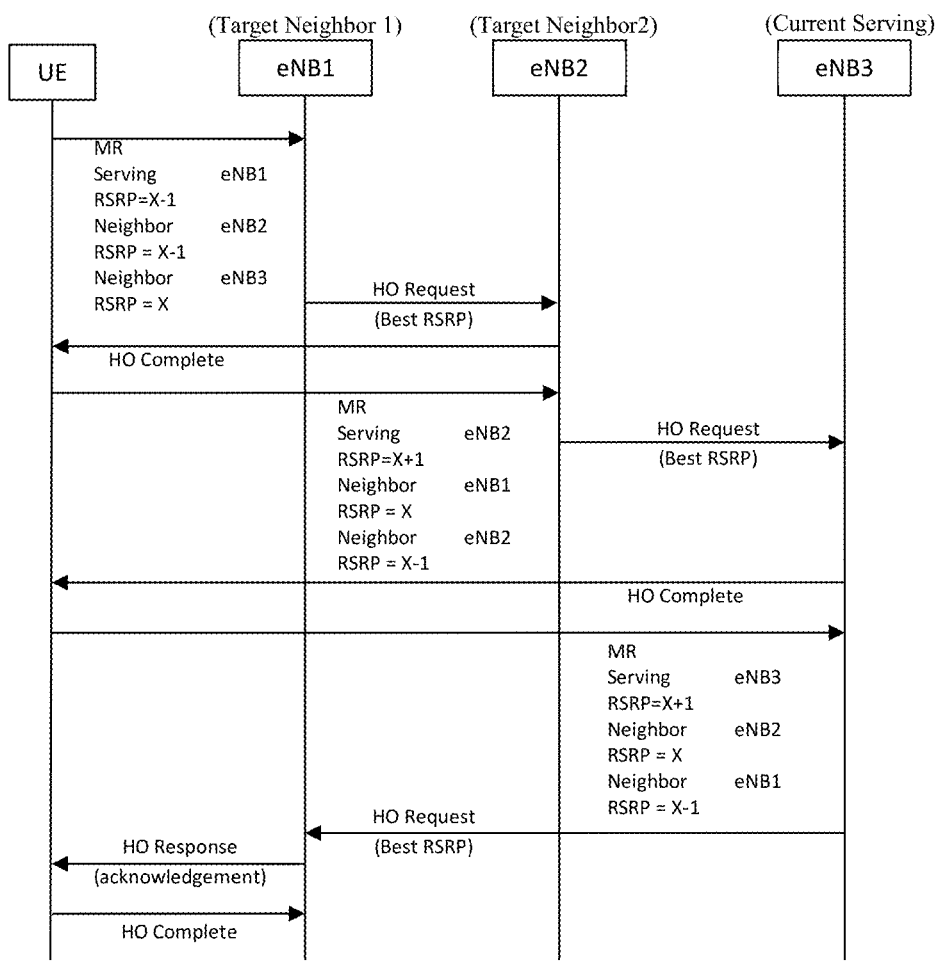
FIG. 6 shows a system flow diagram illustrating the handover process for a UE served by three eNodeBs having comparable signal strengths, in accordance with one embodiment.

FIG. 6 shows a system flow diagram 600 illustrating the handover process for a UE served by three eNodeBs having comparable signal strengths, in accordance with one embodiment. As an option, the system flow diagram 600 may be implemented in the context of the details of the previous figures and/or any subsequent figure(s). Of course, however, the system flow diagram 600 may be implemented in the context of any desired environment. Further, the aforementioned definitions may equally apply to the description below.

In FIG. 6, the MR is sent by the UE when event A3 or event A5 criterion is met on serving eNB3. The HO request is sent to eNB1 when RSRP of Neighbor1 (eNB1)>Serving Cell (eNB3), RSRP of Neighbor 2 (eNB2). After the resource allocation, eNB1 sends an acknowledgement response to the UE that the handover process is completed. The UE also sends an acknowledgment to eNB1 about the handover process completion The process of handover within a set of the same cells may continue occurring frequently due to variations in the radio quality. Such frequent handovers may result in ping-pong handover even for a user who is not moving (i.e. a static UE).

Variation in radio conditions and occurrence of handover ping-pong highly relies on a location of an individual user within a cell. In some other cases, tuning of handover parameters (such as radio quality) may impact all the users in that area. There may be non-dominant coverage scenario when there is overlapping coverage. The overlapping coverage may be in terms of signal strength or quality. Moreover, intelligence added to UEs will impact actual users experiencing non-dominant coverage problem.

From the above examples, it can be understood that there is a need to improve user experience and optimize network resources, and to stop unnecessary ping-pong handovers for static users. Moreover, there is a need to improve user experience for those users who are affected by ping-pong handovers due to frequent unnecessary handovers.

The methods and systems described herein offer a platform for user-specific ping-pong handover mitigation. The method includes tuning of handover parameters for different users based on their location. By using a UE and eNodeB coordinated with a new measurement report strategy, user-specific ping-pong handover can be mitigated to improve user experience.

The system provides a solution for preventing the ping-pong handover issue on the basis of location-based service (LBS) method. The LBS method helps in determining mobility state information of a user. Apart from location information, the mobility state information may include information such as movement of a UE within a same set of cells, static or dynamic state, etc. Thus, using the LBS method, the eNodeB can understand whether the UE is moving to a different location or whether it remains in a static state.

The system/method further include determining a ping-pong scenario based on a ping-pong handover count that occurred within a certain time-period. The ping-pong handovers count is computed by the UE by comparing against a threshold value. The threshold value is provided by an eNodeB (serving cell) in an initial RRC reconfiguration message that helps the UE to know a number of ping-pong handovers that occurred with respect to the time-period.

Moreover, in the initial RRC reconfiguration message, the eNodeB also sends a location offset message to the UE. The location offset message allows the UE to check the mobility state (i.e. static or mobile) of a user. In order to avoid ping-pong handovers and provide handover to a best serving eNodeB, a deferred measurement time is introduced. The measurement timer may differ based on handover type required, i.e., inter-frequency or intra-frequency handover.

After determining the mobility state of the user, parameters of a handover can be tuned accordingly for the handover process. Based on the parameter tuning, measurement reports to be sent by the UE to neighboring cells are deferred to avoid ping-pong handover.

Figure 7:
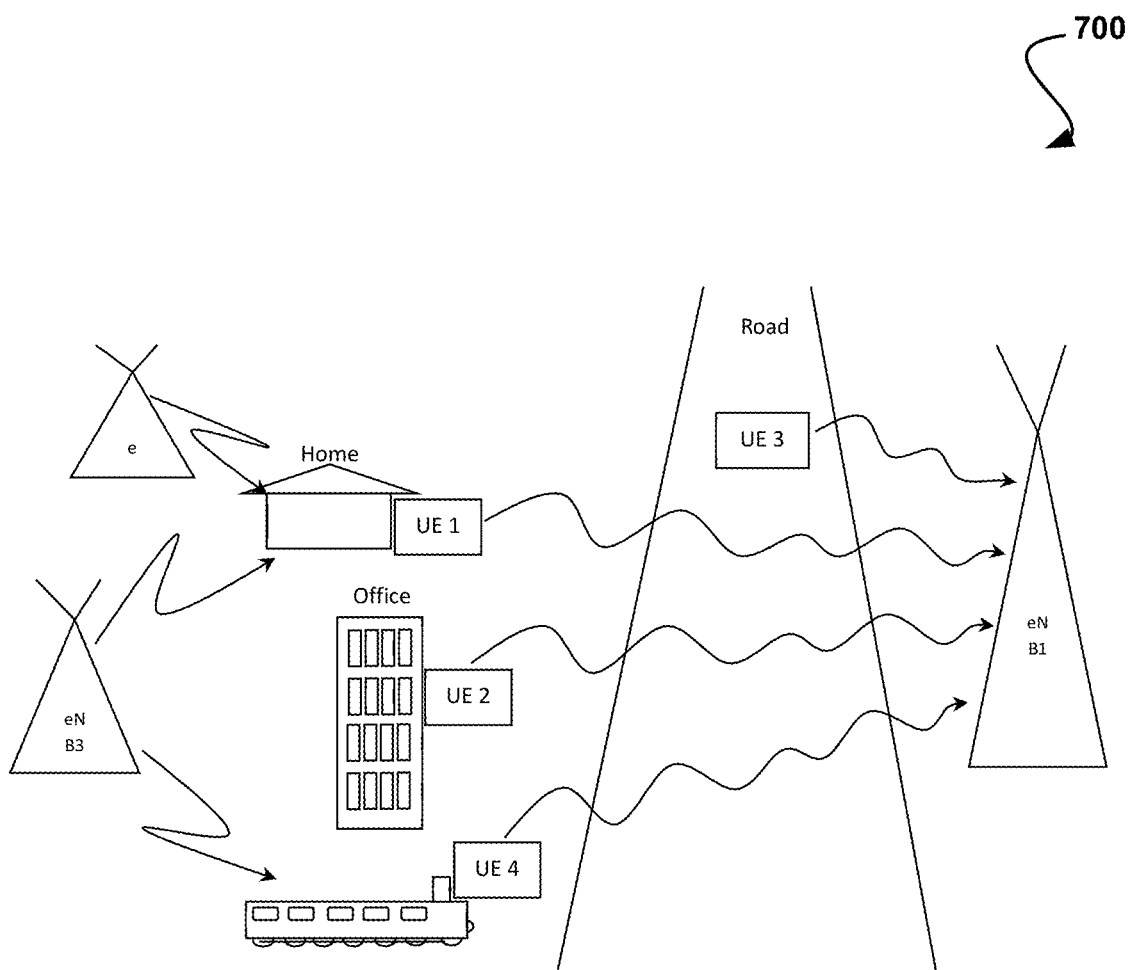
FIG. 7 shows a system diagram illustrating a wireless communication system, in accordance with one embodiment.

The implementation of the system and methods for user-specific ping-pong handover mitigation is explained with a simplified representation as illustrated in FIG. 7.

FIG. 7 shows a system diagram 700 illustrating a wireless communication system, in accordance with one embodiment. As an option, the system diagram 700 may be implemented in the context of the details of the previous figures and/or any subsequent figure(s). Of course, however, the system diagram 700 may be implemented in the context of any desired environment. Further, the aforementioned definitions may equally apply to the description below.

In a wireless communication system, there can be a plurality of UEs connected to different eNodeBs. Referring to FIG. 7, multiple UEs, such as UE1, UE2, UE3, and UE4 are shown that are located in different locations of an area. In this particular area, eNB1 is the serving eNB, while eNB2 and eNB3 are other servers. There may be multiple types of information transmitted by the UE depending on entities that are common and specific to UEs served by an eNB. The signals include measurement reports, periodic reports such as Channel State Information-Channel Quality Indication (CSI-CQI), Precoding Matrix Indicators (PMI), Rank Indication (RI), and power headroom report.

Each UE may be covered by a particular eNodeB. The users can be in different terrains such as high rise buildings like an office, a home, a moving train, or an on-road location. For example, UE1 is at home, UE2 is at the office, UE3 is on the road, and UE4 is on a moving train. Each UE may face handover processes under different scenarios based on its location.

Figure 8:
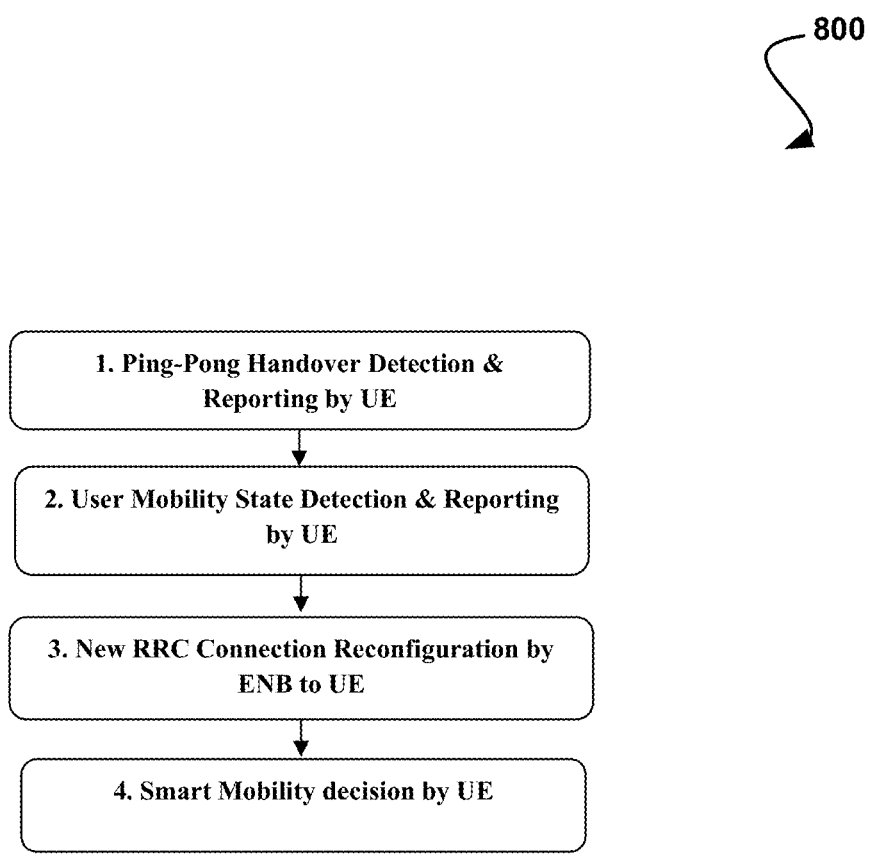
FIG. 8 shows a flow diagram illustrating user-specific ping-pong handover mitigation, in accordance with one embodiment.

FIG. 8 shows a flow diagram 800 illustrating user-specific ping-pong handover mitigation, in accordance with one embodiment. As an option, the flow diagram 800 may be implemented in the context of the details of the previous figures and/or any subsequent figure(s). Of course, however, the flow diagram 800 may be implemented in the context of any desired environment. Further, the aforementioned definitions may equally apply to the description below.

As shown, the first step includes ping-pong handover detection and reporting by a UE. At the UE modem layer, smart logic is included for computing a handover count. The UE checks if X ping-pong handovers have occurred in Y amount of time based on a threshold value provided by eNodeB (where X and Y are positive integers). The threshold value may be initialized in a RRC reconfiguration message. Thus, with the help of the threshold value, the UE will know the handovers that occurred during a ping-pong scenario.

The second step includes user mobility state detection and reporting by the UE. In this case, the UE checks if its location at the time when Step 1 is satisfied is not more that of the location offset provided in the RRC Connection reconfiguration.

In step three, a new RRC Connection reconfiguration is sent by the eNB to the UE. The eNB, on reading the measurement report with details of Step 1 and 2, sends a RRC Connection reconfiguration new IE "Deferred event based measurements" with a parameter, "deferred measurement time".

The fourth step includes a smart mobility decision by the UE. The UE is associated with intelligence that defers sending a measurement report for a time-period mentioned in the new IE.

It may be noted that a handover may differ based on inter-frequency cell or intra-frequency cell type. According to the handover required, measurement report events such as A3 and A5 can be used. In case of intra-frequency, a neighbor cell becomes better than a serving cell by an offset, then an A3 event will be triggered. On the other hand, in case of inter-frequency, a serving cell becomes worse and a neighbor cell becomes better than a specific threshold A5 during a configurable time to trigger, an event A5 will be triggered.

For instance, for an intra-frequency handover, measurement time may be introduced as A3Deferredtimer. In cases of intra-frequency handover, measurement event A3offsetdeferred may be included to a new offset to avoid ping-pong handovers. In case of abnormal scenarios, A3offsetdeferred may be included in the new offset to provide handover to a best serving cell. For an inter-frequency handover, the measurement time may be introduced as A5Deferredtimer. In the case of inter frequency handovers, to avoid a ping-pong handover, A5Threshold1Deferred and A5Thresold2Deferred may be included in the new offset. In the case of abnormal scenarios, A5Threshold1Deferred and A5Thresold2Deferred can be introduced in the new offset to provide handover to a best serving cell.

Figure 9:
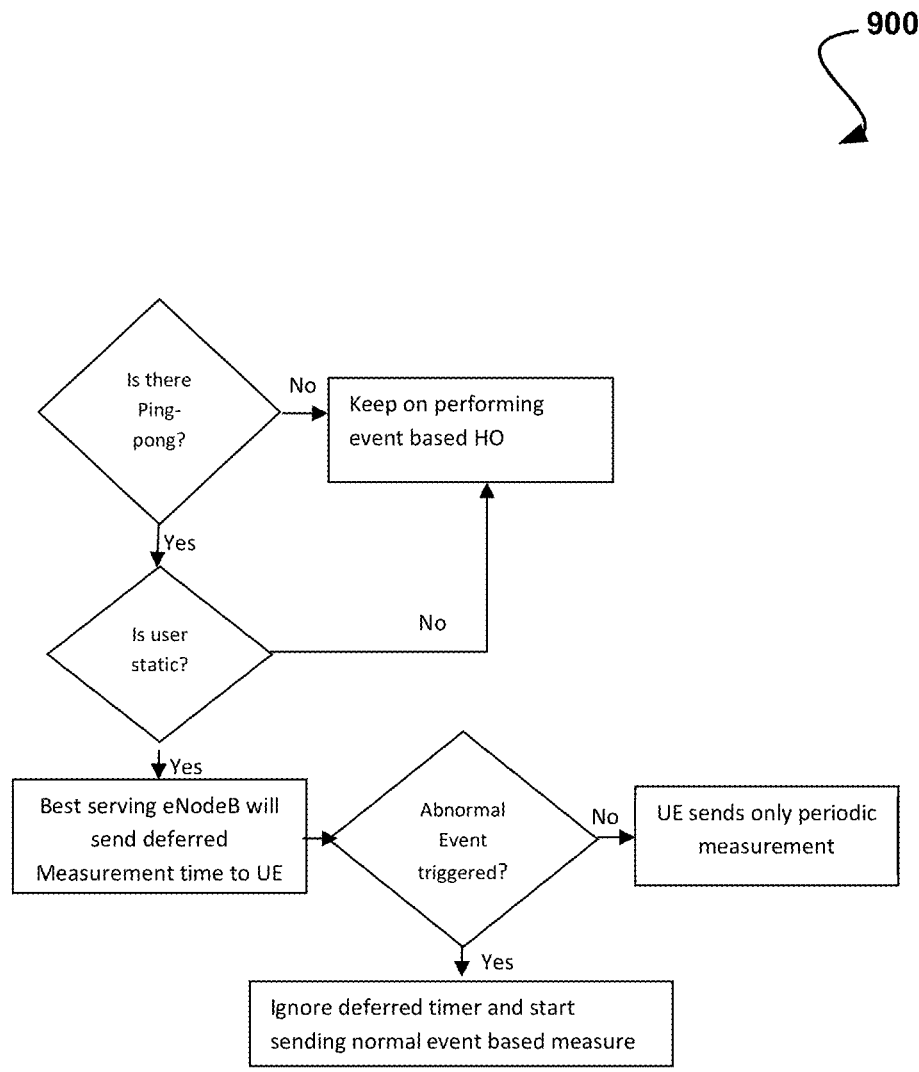
FIG. 9 shows a flow diagram illustrating user-specific ping-pong handover mitigation, in accordance with one embodiment.

FIG. 9 shows a flow diagram 900 illustrating user-specific ping-pong handover mitigation, in accordance with one embodiment. As an option, the flow diagram 900 may be implemented in the context of the details of the previous figures and/or any subsequent figure(s). Of course, however, the flow diagram 900 may be implemented in the context of any desired environment. Further, the aforementioned definitions may equally apply to the description below.

In Step 1, the UE checks for a ping-pong scenario. If there is a ping-pong handover scenario, then the UE proceeds to Step 2. Otherwise, the UE proceeds to Step 3.

In Step 2, the UE will determine if the user is static. The static state is determined from the offset computation already provided by the eNodeB. In Step 3, the system continues to perform event-based handover.

In Step 4, if it is a static user, then a best serving eNodeB reported by the UE will send the deferred timer. The deferred timer is sent through RRC events. The events may include A3offsetdeferred, A5Threshold1Deferred, and A5Thresold2Deferred. Once the deferred timer is received by the UE, the event based measurement will be blocked for the deferred time until an offset condition is satisfied.

In Step 5, after the deferring measurement event, the UE checks for an abnormal event. For any abnormal event triggered, the UE proceeds to Step 6. Otherwise, the UE proceeds to Step 7.

In Step 6, an abnormal event may be triggered for actions such as load balancing or when a location threshold is exceeded. The abnormal location threshold is determined if the periodic location offset calculated at the UE becomes greater than the location offset set by serving eNodeB. The UE can send RRC message to stop deferred timer. In case an abnormal condition is triggered at eNodeB then at eNodeB, the earlier triggered "Deferred event based measurement" will be assigned Null and Void. If the abnormal event is triggered then the UE proceeds with Step 6. If there is no abnormal event, then the UE proceeds to Step 7.

In Step 6, after the reconfiguration is completed, the deferred time is cancelled and the sending of normal event based measures are resumed. In Step 7, the UE can continue sending periodic measurement for the handover required.

In practical scenarios, abnormal events that need handover may be triggered during the deferred time. The abnormal event may be triggered by a serving cell or by a UE, which is discussed with reference to FIG. 10 and FIG. 11.

Figure 10:
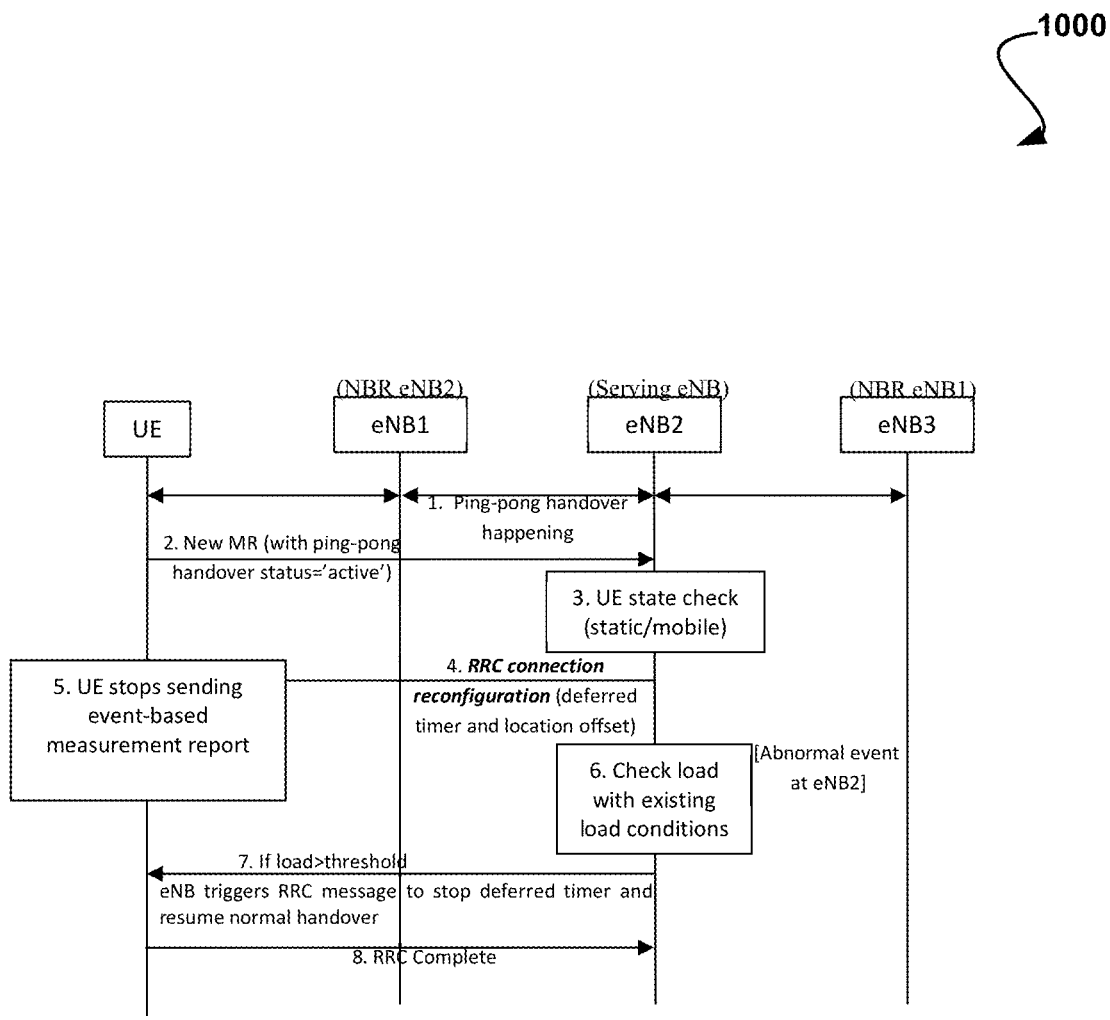
FIG. 10 shows a system flow diagram illustrating a communication flow for resuming handover when an abnormal event is triggered by a serving eNodeB, in accordance with one embodiment.

FIG. 10 shows a system flow diagram 1000 illustrating a communication flow for resuming handover when an abnormal event is triggered by a serving eNodeB, in accordance with one embodiment. As an option, the system flow diagram 1000 may be implemented in the context of the details of the previous figures and/or any subsequent figure(s). Of course, however, the system flow diagram 1000 may be implemented in the context of any desired environment. Further, the aforementioned definitions may equally apply to the description below.

As shown, in Step 1, a ping-pong handover scenario occurs. In Step 2, the UE sends a measurement report to serving eNB, eNB2. The measurement report denotes an active ping-pong handover to eNB2.

In Step 3, eNB2 determines if the UE is static or mobile and accordingly sends a response. In Step 4, eNB2 sends a deferred timer and location offset to the UE via a RRC message. In Step 5, the UE defers sending an event-based measurement report for the deferred timer sent by eNB2.

In Step 6, eNB2 checks the load with existing load conditions. In Step 7, if the load exceeds the threshold defined by eNB2, then the UE has to be informed to cancel the deferred timer. The deferred timer has to be cancelled in order to continue measurement for initiating the load handover process. In Step 8, the UE sends an acknowledgement for RRC reconfiguration completion.

Figure 11:
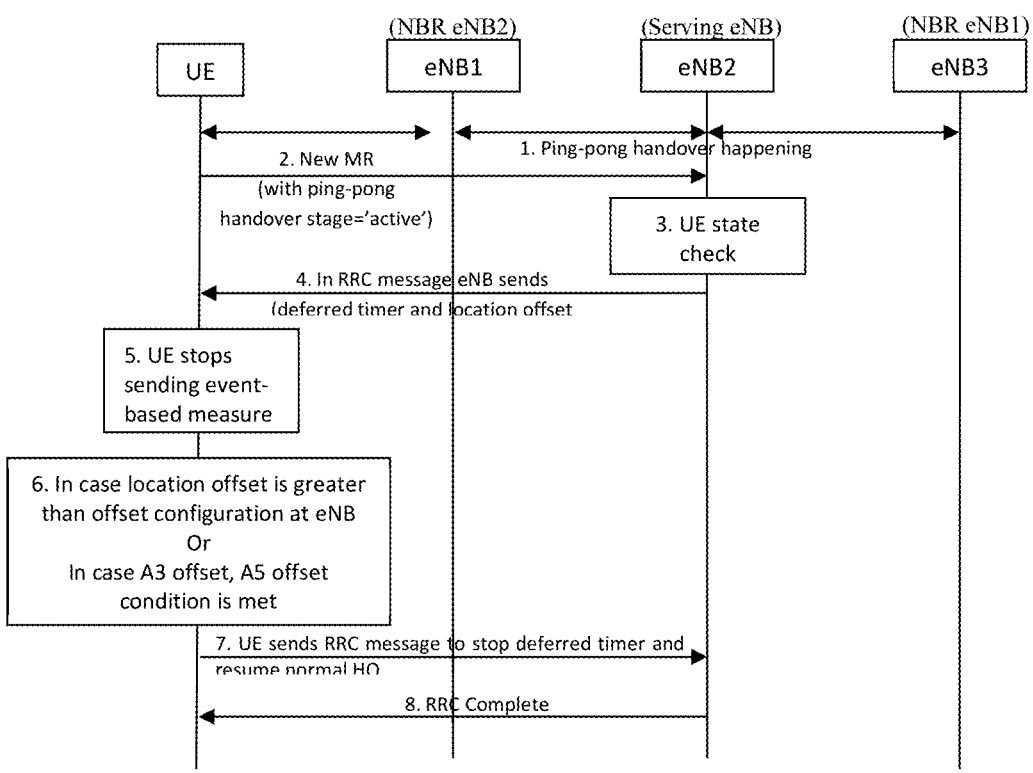
FIG. 11 shows a system flow diagram illustrating a communication flow for resuming handover when an abnormal event is triggered by a UE, in accordance with one embodiment.

FIG. 11 shows a system flow diagram 1100 illustrating a communication flow for resuming handover when an abnormal event is triggered by a UE, in accordance with one embodiment. As an option, the system flow diagram 1100 may be implemented in the context of the details of the previous figures and/or any subsequent figure(s). Of course, however, the system flow diagram 1100 may be implemented in the context of any desired environment. Further, the aforementioned definitions may equally apply to the description below.

As shown, in Step 1, a ping-pong handover scenario occurs. In Step 2, the UE sends a measurement report to serving eNB, eNB2. The measurement report denotes an active ping-pong handover to eNB2.

In Step 3, eNB2 determines whether the UE is static or mobile and accordingly sends a response. In Step 4, eNB2 sends a deferred timer and location offset to the UE via a RRC message. In Step 5, the UE defers sending the event-based measurement report for the deferred timer sent by eNB2.

In Step 6, the UE calculates a location threshold and determines whether a location offset is greater than an offset configuration at eNB. Also/or, the UE determines whether A3 offset and A5 offset condition are met or not.

In Step 7, the UE then sends the RRC message to stop the deferred timer and resume normal handover. In Step 8, eNB2 sends an acknowledgement for RRC reconfiguration completion.

New offsets (A3OFFSETdeferred, A5OFFSETdeferred) may be introduced for the UE handover to a best server cell available at that time to avoid imbalance coverage.

One example scenario is in the case of an intended best server site in a location down for some duration or site fluctuation, the new offsets can be used for UE handover to a best server cell. Based on A3 or A5 event, event based measurements are deferred as described in Table 1.

TABLE 1

If,
   Condition : Ignore Defferedtime,
     For A3 Event, Deferred event based measurements,
      if  RSRP/RSRQNeighbor-RSRP/RSRQserving >
     A3OFFSETdeferred TABLE 1-continued or
For A5 Event, Deferred event based measurements,
  if RSRP/RSRQNeighbor > A5OFFSETdeferred, provided A5
  event (RSRP/RSRQserving<A5Threshold1 is already satisfied)

Figure 12:
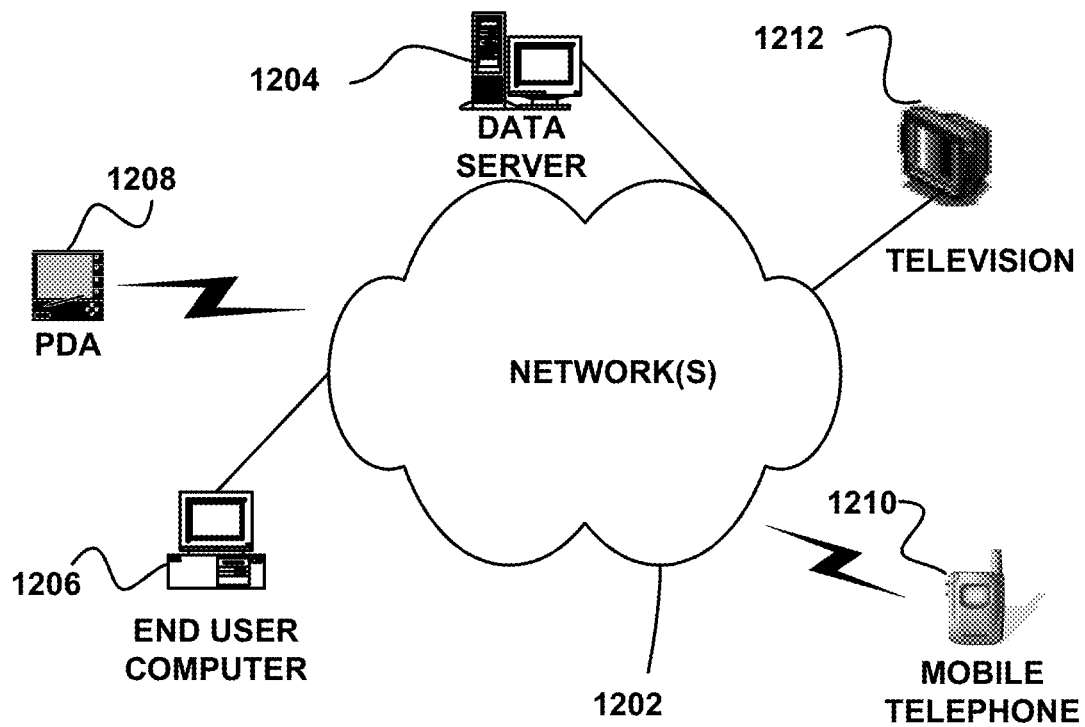
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end-user computer 1206 may be coupled to the network 1202 for communication purposes. Such end-user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
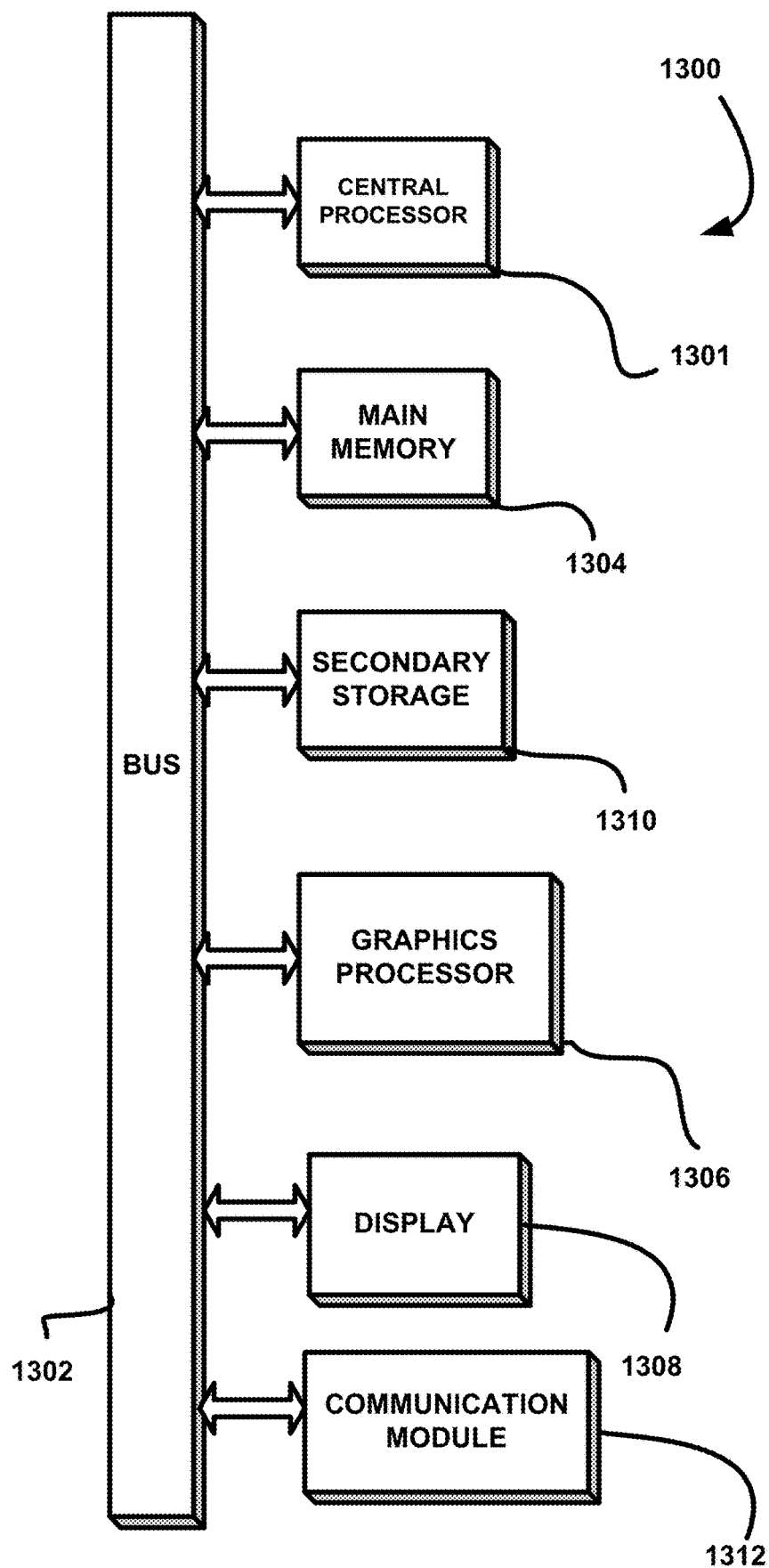
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of non-transitory computer-readable media.

The system 1300 may also include one or more communication modules 1312. The communication module 1312 may be operable to facilitate communication between the system 1300 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    monitoring, by user equipment (UE), for a ping-pong handover scenario between the UE and a plurality of nodes in a wireless communication network, the ping-pong handover scenario including at least a predefined threshold number of ping-pong handovers having occurred between the UE and the plurality of nodes over a predefined period of time;
    detecting, by the UE, the ping-pong handover scenario as having occurred between the UE and the plurality of nodes;

responsive to detecting the ping-pong handover scenario, determining, by the UE, that a mobility state of the UE is static;

providing, by the UE, a measurement report to a best serving node of the plurality of nodes, the measurement report indicating the ping-pong handover scenario as having occurred between the UE and the plurality of nodes and further indicating that the mobility state of the UE is static;

receiving, by the UE as a response to the measurement report, a reconfiguration message including a deferred measurement time indicator from the best serving node of the plurality of nodes; and deferring, by the UE, sending a measurement report to the plurality of nodes for a time-period associated with the deferred measurement time indicator, wherein the sending the measurement report to the plurality of nodes is deferred until an abnormal event is triggered, the abnormal event including a location threshold associated with the mobility state of the UE being exceeded.

2. The method of claim 1, wherein the UE monitors for an abnormal event occurrence.

3. The method of claim 2, wherein the UE sends only periodic measurement reports to the plurality of nodes, based on the deferred measurement time indicator, while it is determined that no abnormal event has occurred.

4. The method of claim 2, wherein the UE disregards the deferred measurement time indicator and sends the measurement report to the plurality of nodes responsive to determining that the abnormal event has occurred.

5. The method of claim 1, wherein the reconfiguration message is a RRC Connection reconfiguration message.

6. The method of claim 5, wherein the RRC Connection reconfiguration message includes a parameter including the deferred measurement time indicator.

7. The method of claim 1, wherein the predefined threshold number of ping-pong handovers is provided to the UE by one of the plurality of nodes in an initial reconfiguration message sent by the one of the plurality of nodes to the UE.

8. The method of claim 1, wherein the deferred measurement time indicator includes a first time offset for inter-frequency handovers and a second time offset for intra-frequency handovers.

9. The method of claim 1, wherein the abnormal event is triggered by the UE, and the UE sends a message to the best serving node to stop a deferred timer associated with the deferred measurement time indicator.

10. The method of claim 9, wherein the reconfiguration message further includes a location offset for use by the UE in determining the abnormal condition relating to the mobility state of the UE.

11. A computer program product embodied on a non-transitory computer readable medium, comprising computer code for:

monitoring, by user equipment (UE), for a ping-pong handover scenario between the UE and a plurality of nodes in a wireless communication network, the ping-pong handover scenario including at least a predefined threshold number of ping-pong handovers having occurred between the UE and the plurality of nodes over a predefined period of time;

detecting, by the UE, the ping-pong handover scenario as having occurred between the UE and the plurality of nodes;

responsive to detecting the ping-pong handover scenario, determining, by the UE, that a mobility state of the UE is static;

providing, by the UE, a measurement report to a best serving node of the plurality of nodes, the measurement report indicating the ping-pong handover scenario as having occurred between the UE and the plurality of nodes and further indicating that the mobility state of the UE is static;

receiving, by the UE as a response to the measurement report, a reconfiguration message including a deferred measurement time indicator from the best serving node of the plurality of nodes; and deferring, by the UE, sending a measurement report to the plurality of nodes for a time-period associated with the deferred measurement time indicator, wherein the sending the measurement report to the plurality of nodes is deferred until an abnormal event is triggered, the abnormal event including a location threshold associated with the mobility state of the UE being exceeded.

12. A system, comprising user equipment (UE), operable for:

monitoring, by the UE, for a ping-pong handover scenario between the UE and a plurality of nodes in a wireless communication network, the ping-pong handover scenario including at least a predefined threshold number of ping-pong handovers having occurred between the UE and the plurality of nodes over a predefined period of time;

detecting, by the UE, the ping-pong handover scenario as having occurred between the UE and the plurality of nodes;

responsive to detecting the ping-pong handover scenario, determining, by the UE, that a mobility state of the UE is static;

providing, by the UE, a measurement report to a best serving node of the plurality of nodes, the measurement report indicating the ping-pong handover scenario as having occurred between the UE and the plurality of nodes and further indicating that the mobility state of the UE is static;

receiving, by the UE as a response to the measurement report, a reconfiguration message including a deferred measurement time indicator from the best serving node of the plurality of nodes; and deferring, by the UE, sending a measurement report to the plurality of nodes for a time-period associated with the deferred measurement time indicator, wherein the sending the measurement report to the plurality of nodes is deferred until an abnormal event is triggered, the abnormal event including a location threshold associated with the mobility state of the UE being exceeded.

* * * * *